(12) United States Patent
Durie et al.

(10) Patent No.: US 8,763,085 B1
(45) Date of Patent: Jun. 24, 2014

(54) PROTECTION OF REMOTELY MANAGED VIRTUAL MACHINES

(71) Applicants: Anthony Robert Durie, Ottawa (CA); Chin Chi Liao, Taipei (TW); Eric Rosenquist, Kanata (CA)

(72) Inventors: Anthony Robert Durie, Ottawa (CA); Chin Chi Liao, Taipei (TW); Eric Rosenquist, Kanata (CA)

(73) Assignee: Trend Micro Incorporated, Tokyo (JP)

( * ) Notice: Subject to any disclaimer, the term of this patent is extended or adjusted under 35 U.S.C. 154(b) by 19 days.

(21) Appl. No.: 13/720,004

(22) Filed: Dec. 19, 2012

(51) Int. Cl.
*G06F 21/00* (2013.01)
*G06F 21/53* (2013.01)

(52) U.S. Cl.
CPC .................. *G06F 21/53* (2013.01)
USPC .................. 726/3; 726/24; 726/25

(58) Field of Classification Search
CPC ......... G06F 21/53; G06F 21/55; G06F 21/56; G06F 21/552; G06F 21/564
USPC ................................................ 726/3, 22–25
See application file for complete search history.

(56) References Cited

U.S. PATENT DOCUMENTS

| | | | |
|---|---|---|---|
| 6,886,096 B2 | 4/2005 | Appenzeller et al. | |
| 7,003,117 B2 | 2/2006 | Kacker et al. | |
| 7,017,181 B2 | 3/2006 | Spies et al. | |
| 7,103,911 B2 | 9/2006 | Spies et al. | |
| 7,113,594 B2 | 9/2006 | Boneh et al. | |
| 7,266,847 B2 | 9/2007 | Pauker et al. | |
| 7,409,719 B2 | 8/2008 | Armstrong et al. | |
| 7,802,000 B1* | 9/2010 | Huang et al. | 709/228 |
| 2004/0179684 A1 | 9/2004 | Appenzeller et al. | |
| 2007/0079307 A1 | 4/2007 | Dhawan et al. | |
| 2008/0134316 A1 | 6/2008 | Devonshire et al. | |
| 2008/0155537 A1 | 6/2008 | Dinda et al. | |
| 2008/0163207 A1 | 7/2008 | Reumann et al. | |
| 2008/0222633 A1 | 9/2008 | Kami | |
| 2008/0244028 A1* | 10/2008 | Le et al. | 709/208 |
| 2009/0158432 A1* | 6/2009 | Zheng et al. | 726/24 |
| 2009/0183173 A1* | 7/2009 | Becker et al. | 719/313 |
| 2009/0204964 A1 | 8/2009 | Foley et al. | |

(Continued)

FOREIGN PATENT DOCUMENTS

| | | |
|---|---|---|
| GB | 2 434 947 | 8/2007 |
| GB | 2 436 668 | 10/2007 |

(Continued)

OTHER PUBLICATIONS

VMware VMotion Live migration of virtual machines without service interuption, 2 sheets, webpage [online][retrieved on Jun. 3, 2009], retrieved from the internet: http://www.vmware.com/files/pdf/vmotion_datasheet.pdf.

(Continued)

*Primary Examiner* — Hadi Armouche
*Assistant Examiner* — Shahriar Zarrineh
(74) *Attorney, Agent, or Firm* — Okamoto & Benedicto LLP

(57) ABSTRACT

Computer security protection of virtual machines is remotely managed by a security manager that communicates with a security agent in each of the virtual machines. The security manager sends a sequence marker to a virtual machine, and expects to receive the sequence marker back from the virtual machine. When the security manager detects that a virtual machine sends a sequence marker that is the same as a previously received sequence marker, the security manager detects that the virtual machine is a clone or a rollback of another virtual machine. In response, the security manager provisions computer security in the virtual machine.

15 Claims, 5 Drawing Sheets

(56) References Cited

U.S. PATENT DOCUMENTS

| | | | |
|---|---|---|---|
| 2009/0328164 A1 | 12/2009 | Sunder et al. | |
| 2010/0169948 A1 | 7/2010 | Budko et al. | |
| 2010/0251363 A1* | 9/2010 | Todorovic | 726/22 |
| 2011/0047545 A1* | 2/2011 | Ellison et al. | 718/1 |
| 2012/0110574 A1* | 5/2012 | Kumar | 718/1 |
| 2012/0117563 A1* | 5/2012 | Chang et al. | 718/1 |

FOREIGN PATENT DOCUMENTS

| | | |
|---|---|---|
| GB | 2 436 910 | 10/2007 |
| WO | 2007088337 | 8/2007 |
| WO | 2007110598 | 10/2007 |

OTHER PUBLICATIONS hp Introduction to Virtual Machine Migration, 2 sheets, webpage [online][retrieved on Jun. 3, 2009], retrieved from the internet: http://docs.hp.com/en/T2767-90067/ch10s01.html.

Interop Labs What is Cisco NAC?, 2 sheets, [retrieved on Jun. 3, 2009], retrieved from the internet: http://www.interop.com/archive/pdfs/2007-06WhatIsCiscoNAC.pdf.

VMware VSphere Live migration of virtual machines, 2 sheets, webpage [online][retrieved on Jun. 3, 2009], retrieved from the internet: http://www.vmware.com/products/vi/vc/vmotion.html.

Cisco Systems—Cisco Network Admission Control (NAC), 2 sheets, webpage [online][retrieved on Jun. 3, 2009], retrieved from the internet: http://www.cisco.com/en/US/netsol/ns466/networking_solutions_package.html.

Cisco NAC Appliance—Wikipedia, the free encyclopedia, 5 sheets [retrieved on Jun. 3, 2009], retrieved from the internet: http://en.wikipedia.org/wiki/Clean_Access_Agent.

Microsoft About NAP (Windows), 1 sheet, webpage [online][retrieved on Jun. 3, 2009], retrieved from the internet: http://msdn.microsoft.com/en-us/library/aa369143(VS.85).aspx.

Amazon Web Services Developer Community: S3 Encryption, posted on Jun. 10, 2009 (1 sheet).

Amazon Web Services: Introducing Amazon Virtual Private Cloud, 1 sheet [retrieved on Aug. 27, 2009], retrieved from the internet: http://aws.amazon.com/.

extern blog SensePost;—Blackhat presentation demo vids: Summary, Aug. 2009, 2 sheets.

Rational Survivability: The Big Four Cloud Computing Providers: Security Compared (Part I), Nov. 26, 2008, 3 sheets.

Cloud Computing, Cloud Hosting & Online Storage by Rackspace Hosting, 4 sheets [retrieved on Aug. 27, 2009], retrieved from the internet: http://www.rackspacecloud.com/.

Saied Hosseini Khayat, "Using Communication Encryption to Share a Secret" Aug. 18, 2008, pp. 1-6, Electrical Engineering Dept., Ferdowsi University of Mashhad, Iran.

Qin Li, et al "Hyper MIP: Hypervisor controlled Mobile IP for Virtual Machine Live Migration across Networks", 2008, pp. 80-88, 11th IEEE High Assurance Systems Engineering Symposium.

Koichi Onoue, et al "A Virtual Machine Migration System Based on a CPU Emulator", 2006, pp. 1-8, IEEE VTDC.

* cited by examiner

PROTECTION OF REMOTELY MANAGED VIRTUAL MACHINES

BACKGROUND OF THE INVENTION

1. Field of the Invention

The present invention relates generally to computer security, and more particularly but not exclusively to providing computer security to virtual machines.

2. Description of the Background Art

Virtual machines in the art of computer science, in general, are well known. Briefly, a virtual machine is a software implementation of computer hardware and executes programs like a real machine. Virtualization allows several virtual machines to run on the same computer hardware. Each virtual machine is, in essence, a separate computer (albeit a virtual one) that has its own operating system, file system, and application programs that are separate from other virtual machines running on the same computer hardware. Just like real computers, virtual machines need to be protected from computer security threats, such as malicious codes, spyware, Trojans, and phishing, to name some examples. Embodiments of the present invention allow for detection and provisioning of cloned, rolled back, or other duplicate virtual machines.

SUMMARY

In one embodiment, computer security protection of virtual machines is remotely managed by a security manager that communicates with a security agent in each of the virtual machines. The security manager sends a sequence marker to a virtual machine, and expects to receive the sequence marker back from the virtual machine. When the security manager detects that a virtual machine sends a sequence marker that is the same as a previously received sequence marker, the security manager detects that the virtual machine is a clone or a rollback of another virtual machine. In response, the security manager provisions computer security in the virtual machine.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
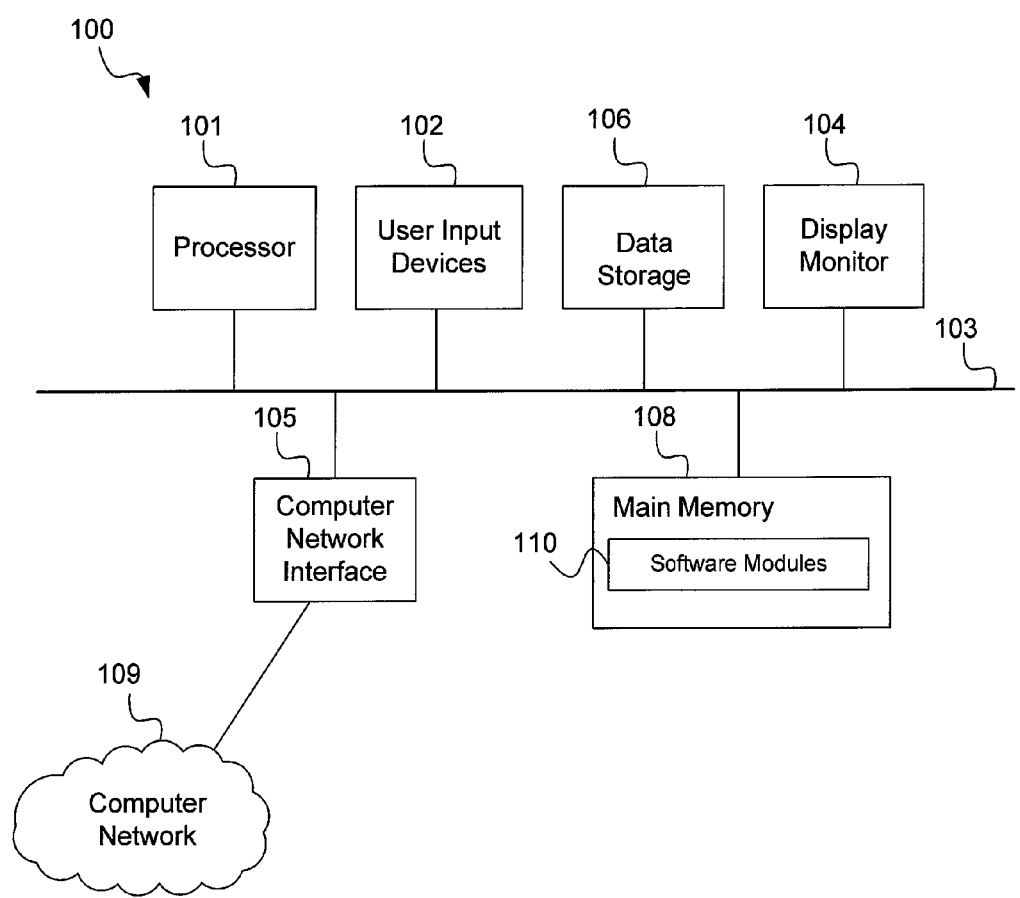
FIG. 1 shows a schematic diagram of a computer that may be employed with embodiments of the present invention.

Referring now to FIG. 1, there is shown a schematic diagram of a computer 100 that may be employed with embodiments of the present invention. The computer 100 may have fewer or more components to meet the needs of a particular application. The computer 100 may include a processor 101. The computer 100 may have one or more buses 103 coupling its various components. The computer 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor, cathode ray tube), a computer network interface 105 (e.g., network adapter, modem), and a main memory 108 (e.g., random access memory). The computer network interface 105 may be coupled to a computer network 109, which in this example includes the Internet.

The computer 100 is a particular machine as programmed with software modules 110. The software modules 110 comprise computer-readable program code stored non-transitory in the main memory 108 for execution by the processor 101. As an example, the software modules 110 may comprise a security manager when the computer 100 is employed as part of a computer system that remotely manages computer security of one or more virtual machines. As another example, the software modules 110 may comprise a virtual machine, including a security agent, when the computer 100 is employed as a computer system that hosts virtual machines.

The computer 100 may be configured to perform its functions by executing the software modules 110. The software modules 110 may be loaded from the data storage device 106 to the main memory 108. An article of manufacture may be embodied as computer-readable storage medium including instructions that when executed by a computer causes the computer to be operable to perform the functions of the software modules 110.

Figure 2:
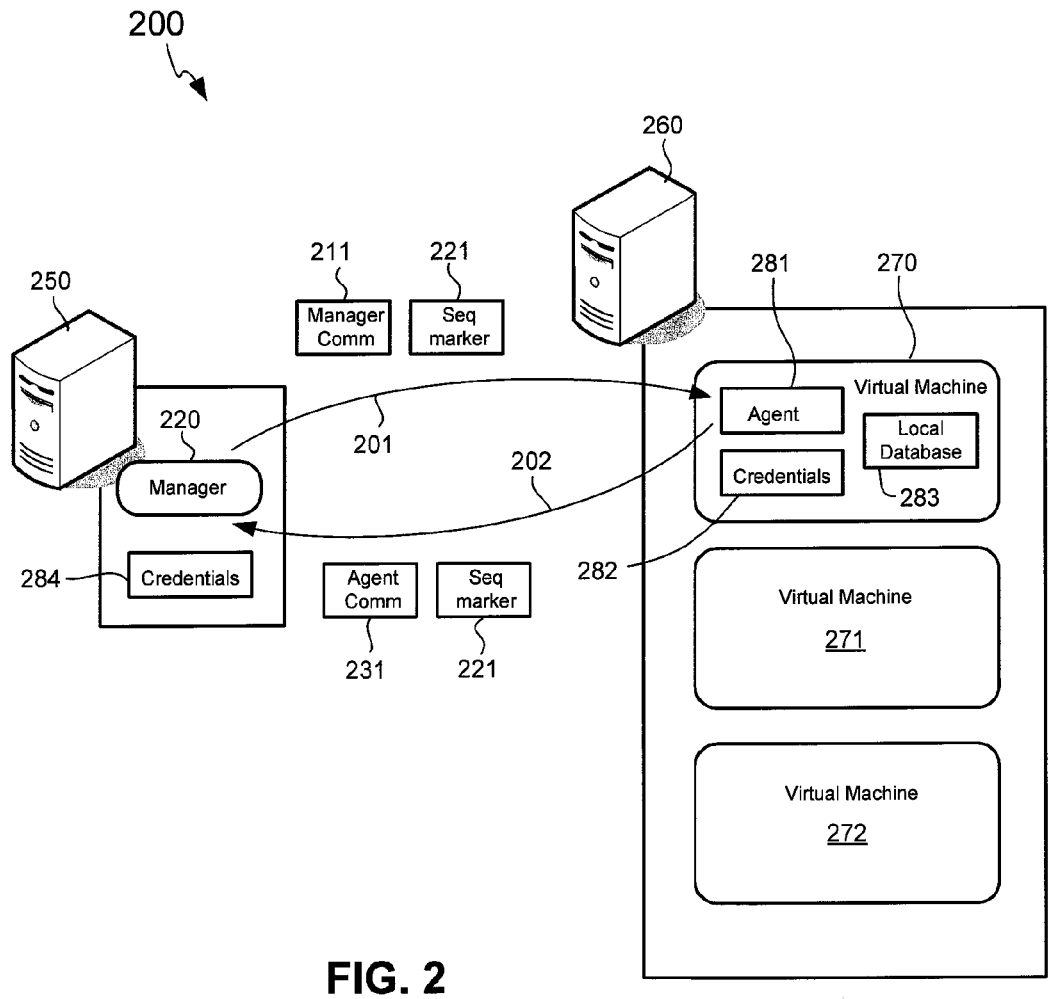
FIGS. 2-4 schematically illustrate operation of a system for providing computer security to virtual machines in accordance with an embodiment of the present invention.

FIG. 2 shows a system 200 for protecting virtual machines from computer security threats in accordance with an embodiment of the present invention. The system 200 may include a computer system 250 and a computer system 260, each of which may comprise one or more computers. The computer systems 250 and 260 may communicate over a computer network, such as over the Internet or a private computer network. In the example of FIG. 2, the computer system 260 hosts virtual machines 270, 271, 272, etc. Each virtual machine has its own operating system, applications, and other software modules generally found in a typical virtual machine. These software modules are not shown for clarity of illustration.

In one embodiment, a virtual machine includes a security agent that works in conjunction with a security manager to protect the virtual machine against computer security threats. In the example of FIG. 2, the virtual machine 270 includes such a security agent, which is labeled as security agent 281. The virtual machine 270 is remotely managed in that its computer security protection is managed by a security manager that is running on a different computer system or at least in a different virtual machine. In the example of FIG. 2, the computer security protection of the virtual machine 270 is managed by the security manager 220 that is running on the computer system 250.

The security agent 281 may comprise computer-readable program code that provides computer security or computer security monitoring in the virtual machine 270.

For example, the security agent 281 may include or work with antivirus, antispam, firewall, and other computer security modules in the virtual machine 270. As another example, the security agent 281 may monitor the virtual machine 270 to ensure that the virtual machine 270 has computer security modules and that the computer security modules are current versions. The security agent 281 may report the results of monitoring and computer security checks (e.g., antivirus scanning) to the security manager 220. The virtual machine 270 may include credentials 282 to allow the security agent 281 to be authenticated and identified by the security manager 220. The credentials 282 may comprise digital certificates, passwords, and other authentication information. The virtual machine 270 may further include a local database 283 for storing sequence markers and other data.

In the example of FIG. 2, the security manager 220 is hosted by the computer system 250. The security manager 220 may comprise computer-readable program code that manages computer security of one or more virtual machines using a security agent in each of the virtual machines. In the example of FIG. 2, the security manager 220 communicates with the security agent 281 to effect computer security policies, provide updated computer security modules, and to receive results of monitoring and computer security checks. The security manager 220 also has access to credentials 284, which the security manager 200 presents to a security agent for authentication.

In an example operation, the security manager 220 sends manager communication data 211 and a sequence marker 221 to the security agent 281 (see arrow 201). Manager communication data comprise data provided by the security manager 220 to a security agent, including credentials for authentication, computer security policies, directives, updated computer security modules, and other data generally provided by the security manager 220 to a security agent.

In one embodiment, the security manager 220 generates a sequence marker that may be used once and only once by a virtual machine to communicate back to the security manager 220. That is, the security manager 220 expects to receive back a sequence marker only once. As its name implies, a sequence marker identifies a particular communication sequence between the security manager 220 and a virtual machine, with a communication sequence consisting of a communication from the security manager 220 to the virtual machine and an immediately following communication from the virtual machine to the security manager 220. Upon receiving communication data from a virtual machine, the security manager 220 checks to ensure that the communication data comes with the same sequence marker previously sent by the security manager 220 to the virtual machine. The security manager 220 then discards that sequence marker and prepares another, different sequence marker for its next communication sequence with the virtual machine. Receiving back a particular sequence marker more than once indicates that a virtual machine may have been cloned or rolled back. A sequence marker may comprise a nonce with a format that is known to and expected by both a security manager and a security agent.

In the example of FIG. 2, the security manger 220 sends a sequence marker 221 to the virtual machine 270. In the virtual machine 270, the security agent 281 receives the sequence marker 221 and sends back the same sequence marker 221 to the security manager 220 along with agent communication data 231 (see arrow 202). Agent communication data may comprise results of monitoring and computer security checks performed in a virtual machine, credentials for authentication, and other data communicated by a security agent to the security manager 220. The security manager 220 verifies that that agent communication data 231 received from the security agent 281 come with the sequence marker 221 that the security manager 220 previously sent to the virtual machine 270.

To provide continuous computer security protection to a virtual machine, the security manager 220 needs to know the virtual machine's timeline, which indicates all security events in the virtual machine and the time and sequence the security events occurred. A security event is an event that affects the computer security of a virtual machine, including installation of new software, detection of computer viruses, disabling computer security, and so on. However, a virtual machine timeline may be disrupted by cloning or rolling back the virtual machine. More specifically, rolling back a virtual machine to a previous, earlier version removes information on security events that occurred after that earlier version of the virtual machine. Cloning a virtual machine may result in two identical virtual machines running at the same time. Because both the original and clone virtual machines run on the same computer system and have the same credentials, the security manager 220 will have no way of determining which virtual machine is which. In that case, the security manager 220 will treat the original and clone virtual machines as the same virtual machine. In embodiments of the present invention, a cloned or rolled back virtual machine will be detected when the cloned or rolled back virtual machine returns a previously returned sequence marker to the security manager 220.

Figure 3:
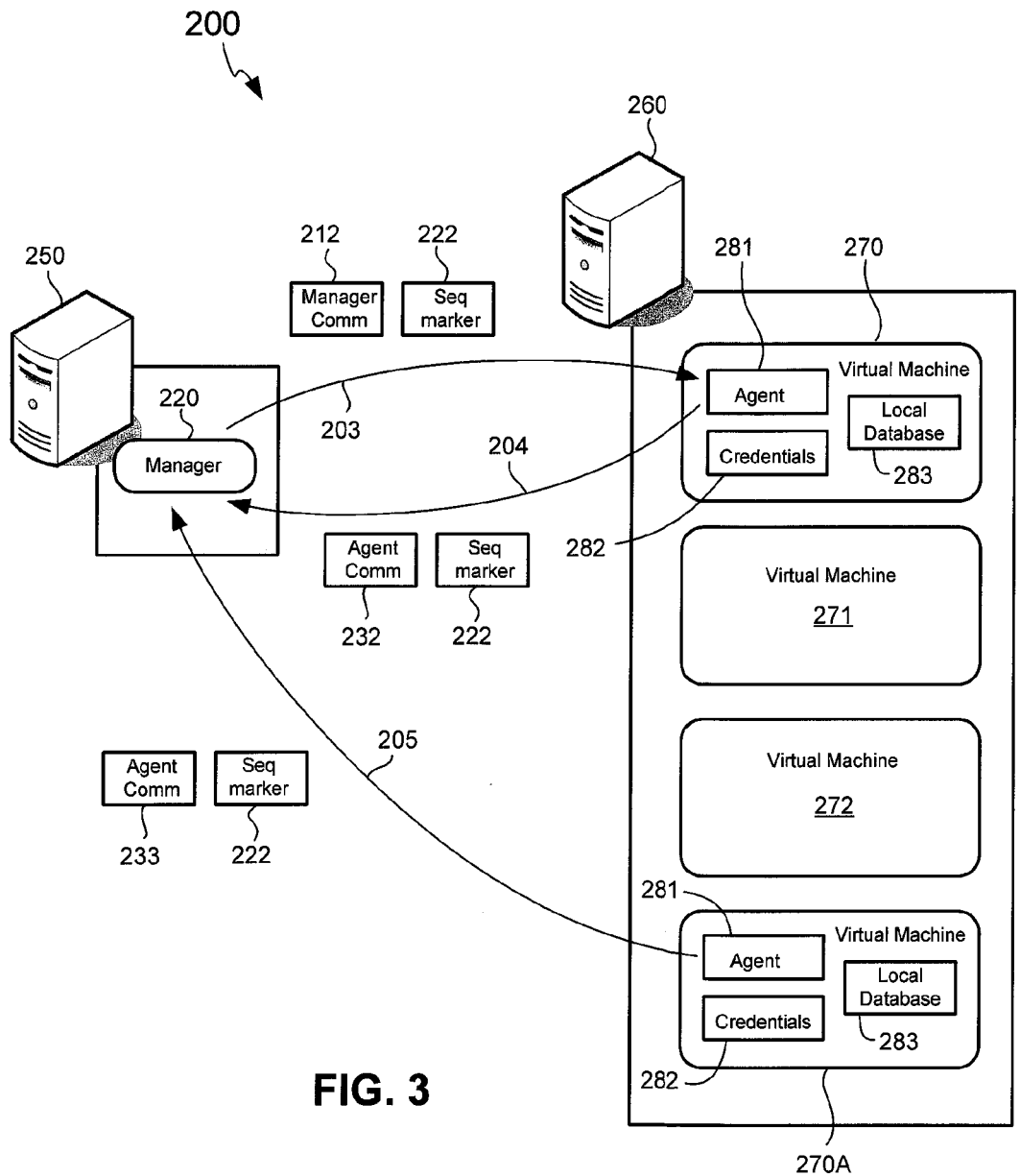

In the example of FIG. 3, the virtual machine 270 receives another manager communication data 212 and sequence marker 222 from the security manager 220 (see arrow 203), with the sequence marker 222 being different from the previously sent sequence marker 221. In the immediately following communication, the security agent 281 sends another agent communication data 232 and returns the sequence marker 222 to the security manager 220 (arrow 204). After receiving the sequence marker 222 from the virtual machine 270, the security manager 220 discards the sequence marker 222 and does not expect the same sequence marker 222 from any virtual machine. That is, after receiving the sequence marker 222, the security manager 220 deems any virtual machine sending the same sequence marker 222 to have been cloned or rolled back and accordingly performs corrective action by, for example, provisioning computer security in the cloned or rolled back virtual machine.

In the example of FIG. 3, the virtual machine 270A is a clone or a rollback of the virtual machine 270. Accordingly, the virtual machine 270A has the same credentials 282 and security agent 281 as the virtual machine 270. However, the virtual machine 270A will have a previously returned sequence marker in its local database 283. In the example of FIG. 3, the local database 283 of the virtual machine 270A still retains the sequence marker 222, which has already been returned by the virtual machine 270 to the security manager 220. When the security agent 281 of the virtual machine 270A sends agent communication data 233 and the sequence marker 222 to the security manager 220 (see arrow 205), the security manager 220 detects that sequence marker 222 is a previously returned sequence marker and accordingly deems the virtual machine 270A as being a clone or a rollback of another virtual machine (which is the virtual machine 270 in this example) having the same credentials.

Figure 4:
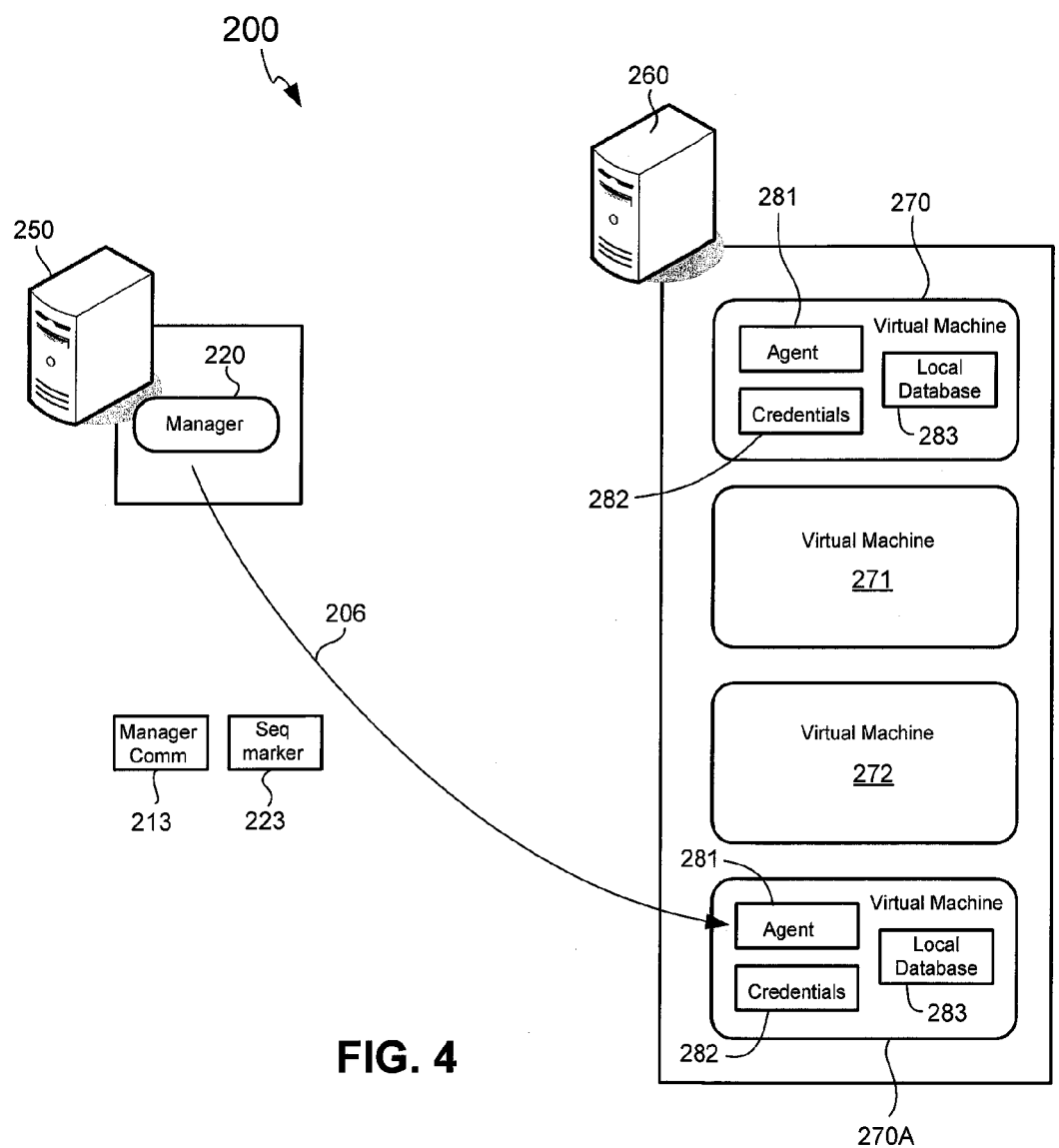
Figure 5:
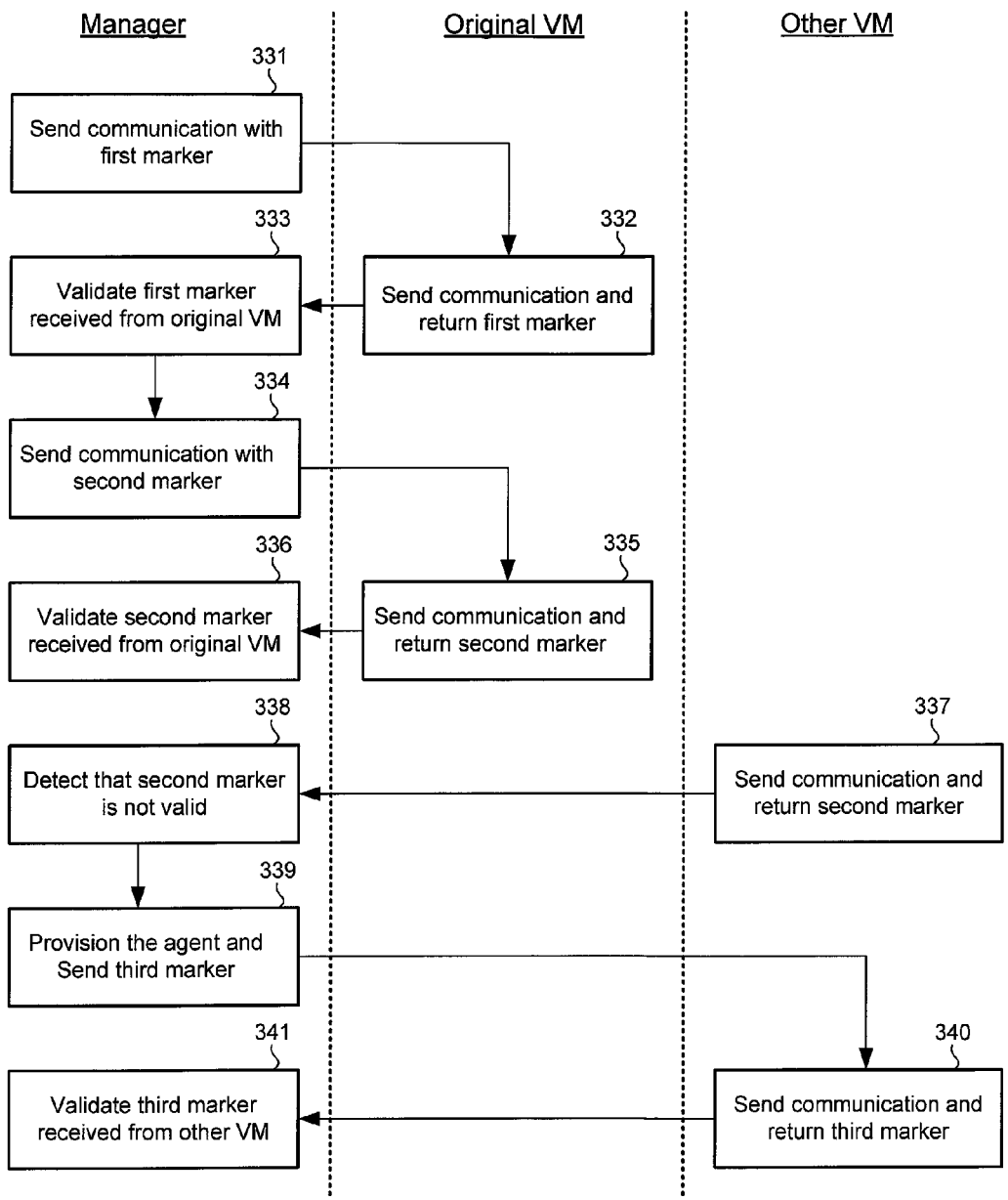
FIG. 5 shows a flow diagram of a method of protecting virtual machines from computer security threats in accordance with an embodiment of the present invention.

In the example of FIG. 4, in response to detecting that the virtual machine 270A is a clone or a rollback of the virtual machine 270, the security manager 220 provisions computer security in the virtual machine 270A by sending manager communication data 213 and a sequence marker 223, which is different from the sequence markers 221 and 222 (see arrow 206). The sequence marker 223 has not been used by any virtual machine to send data to the security manager 220. In the example of FIG. 4, the manager communication data 213 may comprise updated security modules (e.g., updated antivirus scanner and pattern file) and other data for protecting the virtual machine 270A from computer security threats FIG. 5 shows a flow diagram of a method of protecting virtual machines from computer security threats in accordance with an embodiment of the present invention. In the example of FIG. 5, the steps 331, 333, 334, 336, 338, 339, and 341 are performed by a security manager (e.g., security manager 220). The steps 332 and 335 are performed by a security agent that runs in an original virtual machine (e.g., virtual machine 270), and the steps 337 and 340 are performed by a security agent that runs in another virtual machine (e.g., virtual machine 270A). The other virtual machine may be a clone or a rollback of the original virtual machine and is running on the same computer system as the original virtual machine.

In the example of FIG. 5, the security manager sends communication that includes a first sequence marker to the original virtual machine (step 331). The original virtual machine receives the communication and the first marker. In its next following communication with the security manager, the virtual machine returns the first sequence marker to the security manager (step 332). The security manager validates the first sequence marker to ensure that it is the same one originally sent to the original virtual machine (step 333). Subsequently, the security manager sends another communication with a second sequence marker to the original virtual machine (step 334). The second sequence marker is different from the first sequence marker and has not been used by any virtual machine to send communications to the security manager. In this embodiment, the sequence markers are used once and only once by a virtual machine. As before, the original virtual machine returns the second sequence marker in its next communication with the security manager (step 335). Again, the security manager validates the second sequence marker and finds that it is the same one previously sent to the original virtual machine (step 336). The security manager also confirms that this is the first and only time the second sequence marker is returned.

The original virtual machine is cloned or rolled back to the other virtual machine just before returning the second sequence marker. However, the original virtual machine already returned the second sequence marker before the cloning or rolling back took effect. The other virtual machine, which still retains the second sequence marker, returns the second sequence marker with its next communication with the security manager (step 337). In validating the second sequence marker received from the other virtual machine, the security manager detects that the second sequence marker is not valid, i.e., it has previously been returned by the original virtual machine (step 338). This indicates that, although the original and other virtual machines have the same credentials, the other virtual machine is different from the original virtual machine. The most likely scenario is that the other virtual machine is a clone or rollback of the original virtual machine. Because the other virtual machine has a different timeline compared to the original virtual machine, the other virtual machine needs to be managed separately in terms of computer security. Accordingly, the security manager proceeds to provision computer security in the other virtual machine by communicating with and providing a third sequence marker to the other virtual machine (step 339). The third sequence marker is different from the first and second sequence markers, and has not been used by any virtual machine to communicate with the security manager. The other virtual machine returns the third sequence marker to the security manager in its next communication with the security manager (step 340). The security manager receives and validates the third sequence marker (step 341).

Methods and systems for protecting virtual machines from computer security threats have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method for protecting virtual machines from computer security threats, the method comprising:
   sending a first communication and a first sequence marker from a security manager running in a first computer system to a first virtual machine running in a second computer system, the second computer system running a plurality of virtual machines that includes the first virtual machine, the security manager expecting to receive the first sequence marker only once;
   after receiving the first sequence marker back from the first virtual machine, the security manager receiving the first sequence marker back from a second virtual machine having a same credentials as the first virtual machine;
   the security manager detecting that the second virtual machine is a clone or a rollback of the first virtual machine based on receiving a same first sequence marker from both the first and second virtual machines; and
   in response to detecting that the second virtual machine is a clone or a rollback of the first virtual machine, provisioning computer security in the second virtual machine, wherein provisioning computer security in the second virtual machine comprises providing an updated computer security module to the second virtual machine.

2. The method of claim 1 further comprising:
   sending a second communication and a second sequence marker to the second virtual machine after provisioning computer security in the second virtual machine;
   the security manager receiving the second sequence marker back from the second virtual machine; and
   the security manager validating that the second sequence marker received from the second virtual machine is a same as the second sequence marker the security manager previously sent to the second virtual machine.

3. The method of claim 1 wherein the credentials comprise a digital certificate.

4. The method of claim 1 wherein the updated computer security module comprises an updated antivirus.

5. The method of claim 1 wherein the first virtual machine stores the first sequence marker in a local database.

6. A system for providing computer security to virtual machines, the system comprising:
   a first computer system running a plurality of virtual machines, a first virtual machine in the plurality of virtual machines receiving a first sequence marker from a security manager running in a second computer system and returns the first sequence marker to the security manager in its next immediately following communication with the security manager;
   the second computer system running the security manager, the security manager sending the first sequence marker to the first virtual machine and expecting the first sequence marker to be returned only once, the security manager receiving the first sequence marker from the first virtual machine and thereafter receiving the first sequence marker from a second virtual machine that has a same credential as the first virtual machine, the security manager detecting that the second virtual machine is different from the first virtual machine based on receiving the first sequence marker from the second virtual machine after receiving the first sequence marker from the first virtual machine; and in response to detecting that the second virtual machine is different from the first virtual machine, provisioning computer security in the second virtual machine, wherein provisioning computer security in the second virtual machine comprises providing an updated computer security module to the second virtual machine.

7. The system of claim 6 further comprising a local database storing the first sequence marker in the first virtual machine.

8. The system of claim 6 wherein the credential comprises a digital certificate.

9. The system of claim 6 wherein the security manager detects that the second virtual machine is a clone or rollback of the first virtual machine.

10. The system of claim 6 wherein the updated computer security module comprises an updated antivirus.

11. A method for protecting virtual machines from computer security threats, the method comprising:

sending a first sequence marker to a first virtual machine in a plurality of virtual machines;

receiving the first sequence marker from the first virtual machine;

validating the first sequence marker received from the first virtual machine to ensure that the first sequence marker received from the first virtual machine is same as the first sequence marker sent to the first virtual machine;

detecting that a second virtual machine is different from the first virtual machine based on receiving the first sequence marker from the second virtual machine after receiving the first sequence marker from the first virtual machine, the second virtual machine having a same credential as the first virtual machine, and in response to detecting that the second virtual machine is different from the first virtual machine, provisioning computer security in the second virtual machine, wherein provisioning computer security in the second virtual machine comprises providing an updated computer security module to the second virtual machine.

12. The method of claim 11 wherein the first and second virtual machines have a same digital certificate.

13. The method of claim 11 wherein the updated computer security module comprises an updated antivirus.

14. The method of claim 11 further comprising:

sending a second sequence marker to the second virtual machine; and receiving the second sequence marker back from the second virtual machine.

15. The method of claim 14 further comprising:

validating the second sequence marker received from the second virtual machine.

\* \* \* \* \*